US011875984B2

(12) United States Patent
Weder et al.

(10) Patent No.: US 11,875,984 B2
(45) Date of Patent: Jan. 16, 2024

(54) TIME-OF-FLIGHT MASS SPECTROMETER ASSEMBLY WITH A SECONDARY FLANGE

(71) Applicant: INFICON, Inc., East Syracuse, NY (US)

(72) Inventors: Mario Weder, Manlius, NY (US); Michael Vollero, Manlius, NY (US); Nigel Sousou, Liverpool, NY (US)

(73) Assignee: INFICON, Inc., East Syracuse, NY (US)

( * ) Notice: Subject to any disclaimer, the term of this patent is extended or adjusted under 35 U.S.C. 154(b) by 0 days.

(21) Appl. No.: 18/018,926

(22) PCT Filed: May 10, 2022

(86) PCT No.: PCT/US2022/028494
§ 371 (c)(1),
(2) Date: Jan. 31, 2023

(87) PCT Pub. No.: WO2022/240813
PCT Pub. Date: Nov. 17, 2022

(65) Prior Publication Data
US 2023/0215718 A1 Jul. 6, 2023

Related U.S. Application Data

(60) Provisional application No. 63/187,054, filed on May 11, 2021.

(51) Int. Cl.
*H01J 49/40* (2006.01)
*H01J 49/04* (2006.01)

(52) U.S. Cl.
CPC .......... *H01J 49/40* (2013.01); *H01J 49/0495* (2013.01)

(58) Field of Classification Search
CPC .............................. H01J 49/40; H01J 49/0495
(Continued)

(56) References Cited

U.S. PATENT DOCUMENTS 5,770,858 A 6/1998 Fuchs et al.
5,955,729 A * 9/1999 Nelson ................ G01N 21/553 250/423 P (Continued)

OTHER PUBLICATIONS

PCT/US2022/028494; International Filing Date May 10, 2022; International Search Report and Written Opinion; dated Aug. 16, 2022 (8 pages).

(Continued)

*Primary Examiner* — Kiet T Nguyen
(74) *Attorney, Agent, or Firm* — Barclay Damon LLP

(57) ABSTRACT

A time-of-flight mass spectrometer assembly includes a flange with a vacuum chamber facing surface and an environment facing surface. The flange defines an opening that extends between the vacuum chamber facing surface and the environment facing surface. A plurality of stacked components are supported by the vacuum chamber facing surface of the flange. A secondary flange is removably secured within the opening of the flange. The secondary flange includes a vacuum chamber facing surface and an environment facing surface. A supported spectrometer component is supported by the vacuum chamber facing surface of the secondary flange such that removal of the secondary flange from the flange acts to remove the supported component from the plurality of stacked components supported by the vacuum chamber facing surface of the flange.

19 Claims, 3 Drawing Sheets

(58) Field of Classification Search
USPC .......................................................... 250/287
See application file for complete search history.

(56) References Cited

U.S. PATENT DOCUMENTS

| | | | |
|---|---|---|---|
| 2003/0189170 | A1 | 10/2003 | Covey et al. |
| 2004/0018320 | A1 | 1/2004 | Nicolussi |
| 2005/0128679 | A1 | 6/2005 | Gore et al. |
| 2006/0016983 | A1 | 1/2006 | Kobayashi |
| 2018/0174810 | A1 * | 6/2018 | Suyama .................. G01T 1/241 |
| 2019/0333748 | A1 | 10/2019 | Takahashi et al. |
| 2020/0395203 | A1 * | 12/2020 | Murray ................... H01J 49/26 |
| 2021/0343518 | A1 * | 11/2021 | Pophristic ........... H01J 49/0409 |

OTHER PUBLICATIONS

Jordan TOF Products, Inc., article entitled Linear Time of Flight Components Ion Sources, Microchannel Plate Detectors, TOF Power Supplies, found at http://www.rmjordan.com/linear-tof.html, as printed from World Wide Web on Aug. 16, 2023 (total 3 pages).

* cited by examiner

TIME-OF-FLIGHT MASS SPECTROMETER ASSEMBLY WITH A SECONDARY FLANGE

CROSS REFERENCE TO RELATED APPLICATIONS/PRIORITY CLAIM

This application is a national stage application pursuant to 35 U.S.C. § 371 of International Application No. PCT/US2022/028494, filed on May 10, 2022, which is related to and claims the benefit of and priority to U.S. Provisional Patent Application Ser. No. 63/187,054, filed May 11, 2021, and entitled "TIME-OF-FLIGHT MASS SPECTROMETER DETECTOR." The entirety of said applications are incorporated herein by reference.

TECHNICAL FIELD

The foregoing disclosure relates to an improved time-of-flight (TOF) mass spectrometer and more specifically to a more compact TOF mass spectrometer that has at least one spectrometer component that is able to be easily removed and replaced using a secondary flange.

BACKGROUND OF THE INVENTION

Time-of-flight mass spectrometry is a method of mass spectrometry using an ion's time-of-flight to determine its mass-to-charge ratio. Time-of-flight mass spectrometry uses a TOF mass spectrometer that includes, among other components, a detector and an ion source. The components of the TOF mass spectrometer are arranged along a backbone structure with the detector surrounded by other components of the TOF mass spectrometer. While the backbone provides a secure mounting point for TOF mass spectrometer components, it leads to a very long TOF mass spectrometer. Moreover, components, such as the detector, which may require removal and replacement, are difficult to access without dismantling a large portion of the TOF mass spectrometer. Such dismantling takes time and causes significant down time as well as an increased chance of damage to other components during dismantling and reassembly.

These are some of the disadvantages of current TOF mass spectrometers being used.

SUMMARY OF THE INVENTION

The disclosed TOF mass spectrometer assembly includes a plurality of components that are assembled on a main flange, which is coupled to a vacuum chamber. The main flange further defines an opening that accepts a secondary flange, which supports at least one of the components of the TOF mass spectrometer. In this manner, only the at least one supported component can be removed from the vacuum chamber without the need to uncouple the main flange from the vacuum chamber and remove the entire TOF mass spectrometer assembly. This makes removal and replacement of the at least one supported component easier and faster, which results in less down time for the TOF mass spectrometer assembly. It also allows the rest of the TOF mass spectrometer to remain protected in the vacuum chamber from contamination (e.g., dust) and incidental damage. Moreover, the secondary flange enables precise placement of the supported component relative to other components of the TOF mass spectrometer assembly that remain inside the vacuum chamber.

An embodiment of a time-of-flight mass spectrometer assembly for installation into a vacuum chamber comprises a flange configured to be secured to an opening of the vacuum chamber. The flange includes a vacuum chamber facing surface and an environment facing surface. The flange also defines a cut-out portion that extends between the vacuum chamber facing surface and the environment facing surface. A plurality of components are assembled onto and supported by the vacuum chamber facing surface of the flange and are configured to be positioned inside the vacuum chamber. A secondary flange is configured to be removably secured to the flange to close off the cut-out portion of the flange. The secondary flange includes a vacuum chamber facing surface and an environment facing surface. A supported component is coupled to the vacuum chamber facing surface of the secondary flange. Accordingly, removal of the secondary flange from the flange acts to remove the supported component from the vacuum chamber while keeping the flange secured to the opening of the vacuum chamber.

In an embodiment, the supported component is a detector. In an embodiment, the vacuum chamber facing surface of the flange extends along a plane that is above the vacuum chamber facing surface of the secondary flange when the secondary flange is removably secured to the flange so as to close off the cut-out portion of the flange. In an embodiment, the secondary flange is secured to the flange using a plurality of fasteners positioned around a perimeter of the secondary flange. In an embodiment, at least one of the plurality of components comprises an ion source. In an embodiment a seal is positioned between the flange and the secondary flange. In a further embodiment, the seal is comprised of a metal. In another embodiment, the secondary flange defines one or more pass-through connections to connect the supported component to a controller.

A further embodiment of a time-of-flight mass spectrometer includes a flange having a vacuum chamber facing surface and an environment facing surface. The flange defines an opening that extends between the vacuum chamber facing surface and the environment facing surface. A plurality of stacked components are supported by the vacuum chamber facing surface of the flange. A secondary flange is removably secured within the opening of the flange and comprises a vacuum chamber facing surface and an environment facing surface. A supported component is configured to be supported by the vacuum chamber facing surface of the secondary flange such that removal of the secondary flange from the flange acts to remove the supported component from the plurality of stacked components supported by the vacuum chamber facing surface of the flange.

An embodiment of a method of manufacturing a time-of-flight mass spectrometer is provided. The method includes structuring a flange to: comprise a vacuum chamber facing surface and an environment facing surface; define an opening that extends between the vacuum chamber facing surface and the environment facing surface; and support a plurality of stacked components on the vacuum chamber facing surface of the flange. The method further includes structuring a secondary flange to: comprise a vacuum chamber facing surface and an environment facing surface; and be removably secured to the flange so as to close the opening of the flange. A supported component is structured to be supported by the vacuum chamber facing surface of the secondary flange such that removal of the secondary flange from the flange acts to remove the supported component from the plurality of stacked components supported by the vacuum chamber facing surface of the flange.

An embodiment of a flange for a time-of-flight mass spectrometer assembly comprises a body configured to couple to a vacuum chamber. The body includes a vacuum chamber facing surface and an environment facing surface. An opening defined in the body extends between the vacuum chamber facing surface and the environment facing surface and defines an inner lip. A plurality of openings are positioned around a perimeter of the body that are each dimensioned to accept a fastener to couple the body to the vacuum chamber. A secondary flange is dimensioned to at least partially fit within the opening of the body of the flange and a seal is positioned between the secondary flange and the body of the flange.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

The attached drawings are for purposes of illustration and are not necessarily to scale.

DETAILED DESCRIPTION OF THE INVENTION

The following discussion relates to various embodiments of a time-of-flight mass spectrometer assembly with a secondary flange. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upstream", "downstream", "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of a time-of-flight mass spectrometer assembly with a secondary flange and are not specifically provided to scale.

Figure 1:
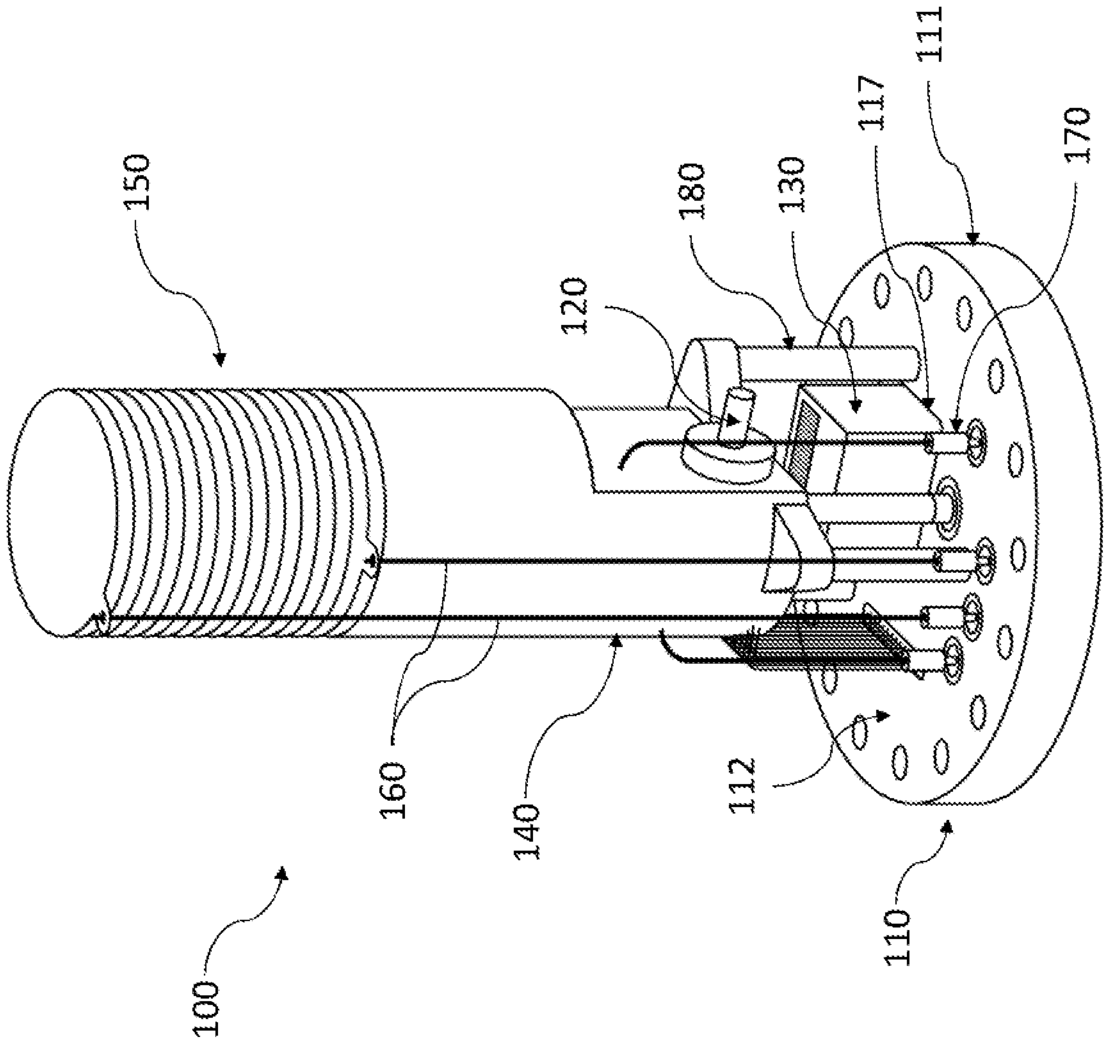
FIG. 1 illustrates a perspective side view of an embodiment of components of a time-of-flight mass spectrometer assembly stacked on a flange.

Referring to FIG. 1, an embodiment of a TOF mass spectrometer assembly 100 is shown assembled on a flange 110 having a flange body 111. Specifically, the plurality of spectrometry components 120, 140, 150 are assembled on a vacuum chamber facing surface 112 of the body 111 of the flange 110. The plurality of spectrometry components 120, 140, 150 of the TOF mass spectrometer assembly 100 are stacked on the vacuum chamber facing surface 112 of the flange 110 such that the entire TOF mass spectrometer assembly 100 is more compact and can be entirely inserted into and removed from a vacuum chamber 50 (see FIG. 3) in a single unit. As shown in FIG. 1, one or more of the plurality of spectrometer components 120, 140, 150 may be coupled to each other and then to one or more supports 180, which are in turn coupled to body 111 of the flange 110. In the illustrated example, the components 150 and 120 are coupled to component 140, which is in turn attached to flange 110 by support 180. In this manner a structurally stable and compact TOF mass spectrometer assembly 100 can be constructed. The spectrometer components 120, 130, 140, 150 are generally known in the art and will not be individually described in detail, nor will the overall operation of the disclosed TOF mass spectrometer assembly 100 be discussed in detail. In an embodiment the plurality of spectrometer components may include an ion source 120, transfer optics, grids, acceleration electrodes, and drift tube (each included as part of 140), and ion mirror 150.

One or more connections 160 are configured to connect the plurality of spectrometer components 120, 140, 150 to pass-through connections 170 in the body 111 of the flange 110. The pass-through connections 170 extend between the vacuum chamber facing surface 112 to the environment facing surface 114 of the flange 110 so that one or more of the connections 160 can couple to an outside component 400 (see FIG. 3). The outside component 400 may include a power source, a controller, or any other source or means of controlling the corresponding components 120, 140, 150 of the TOF mass spectrometer assembly 100 by way of pass-through connections 170 (see FIGS. 2 and 3).

Figure 2:
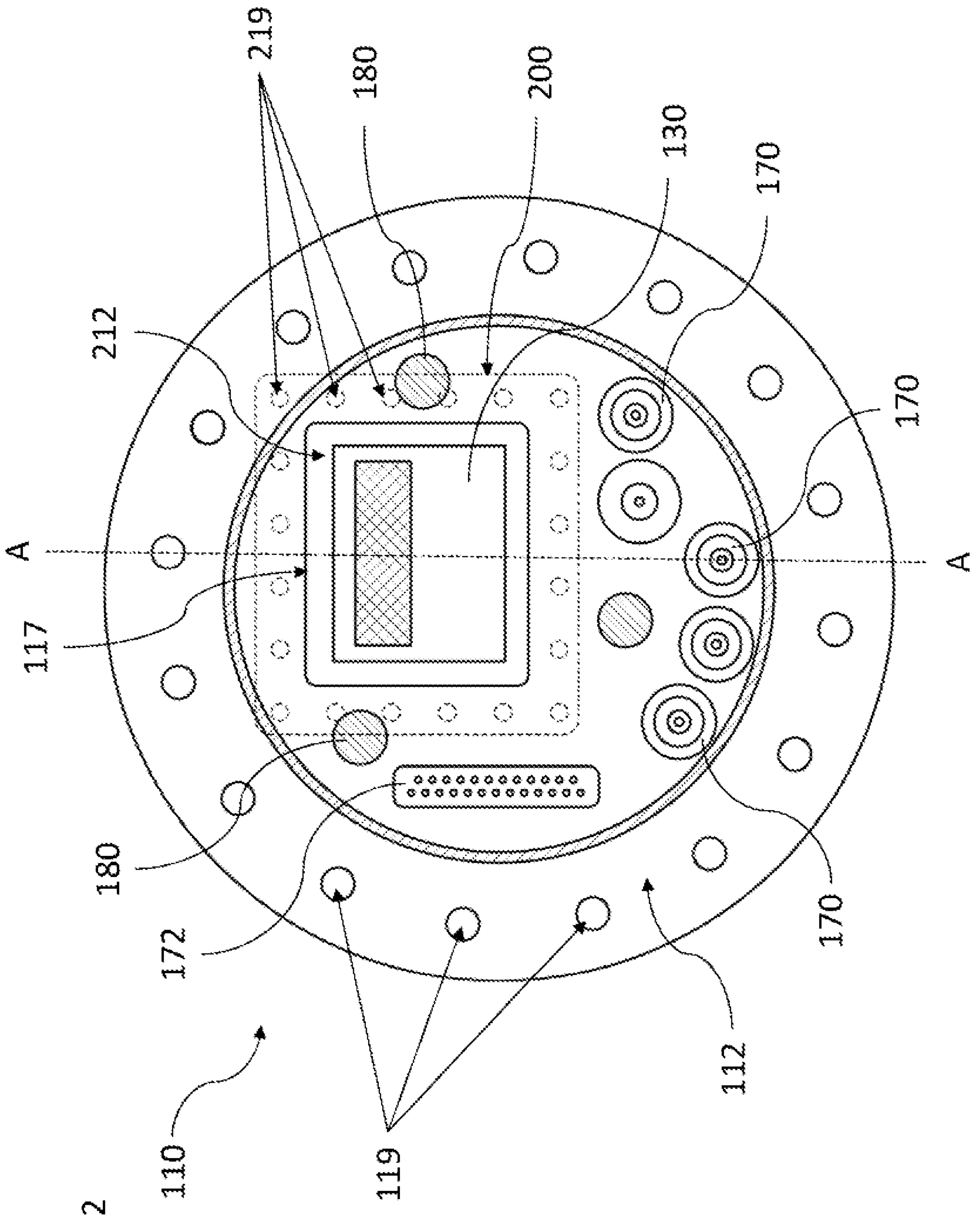
FIG. 2 illustrates a top plan view of the flange.

FIG. 2 shows the vacuum chamber facing surface 112 of the body 111 of the flange 110. The flange 110 is coupled to the vacuum chamber 50 using a plurality of fasteners 119 positioned around the perimeter of the body 111 of the flange 110. The plurality of pass-through connections 170 are shown positioned inside or radially inward from the plurality of fasteners 119. As can be seen in FIG. 2, the pass-through connections 170 may be of varying size depending on the type of connection. Another type of pass-through connection 172 is shown which may couple to a controller and/or data collection device (not shown).

Figure 3:
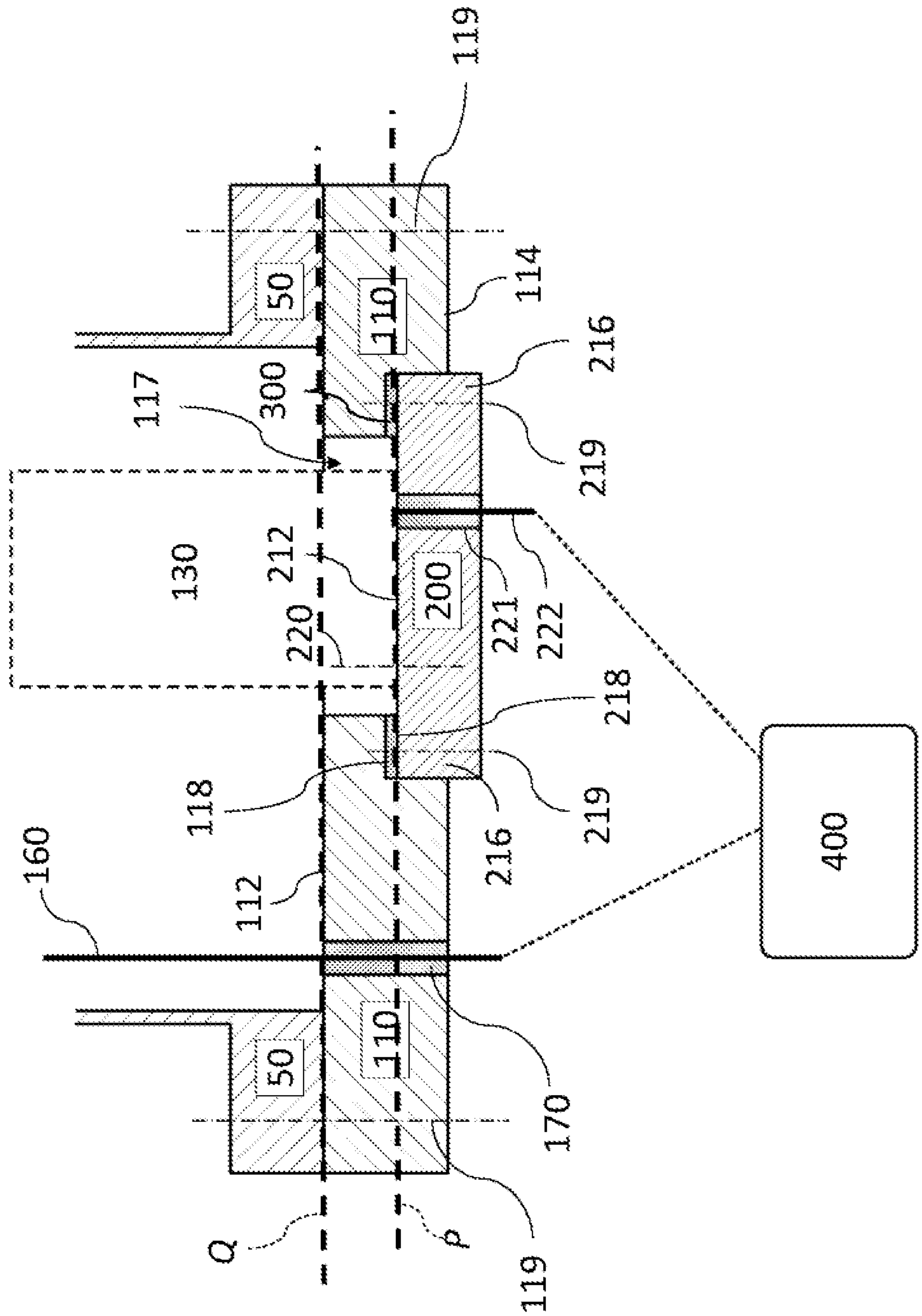
FIG. 3 schematically illustrates a sectional view of the embodiment of FIG. 2 taken along line A-A.

Turning to FIG. 3, the body 111 of the flange 110 defines a cut-out portion 117 or opening that extends between the vacuum chamber facing surface 112 and the environment facing surface 114. The cut-out portion 117 is positioned radially inward from the plurality of fasteners 119 and is configured to accept a secondary flange 200. The secondary flange 200 as shown in FIG. 2 is polygonal in shape, however this may not be the case in other embodiments of the secondary flange 200. Referring back to FIG. 3, the secondary flange 200 has a vacuum chamber facing surface 212 and an environment facing surface 214. A lip 216 is defined around the perimeter of the secondary flange 200 and is coupled to the flange 110 by a plurality of secondary flange fasteners 219 positioned through the lip 216 of the secondary flange 200.

Turning to FIG. 3, the vacuum chamber facing surface 212 of the secondary flange 200 is configured to support a component 130 of the TOF mass spectrometer assembly 100. In an embodiment, the supported component 130 is an ion detector, however in other embodiments, the supported component may be another component of the TOF mass spectrometer assembly 100. The supported component 130 may be coupled directly to the secondary flange 200 with one or more couplers 220. The flange 110, secondary flange 200, and supported component 130 are configured such that installation of the secondary flange 200 locates the supported component 130 in the correct proximity to the rest of the plurality of spectrometer components for proper functioning of the TOF mass spectrometer assembly 100. A seal 300 is positioned between an inner surface 118 of the flange 110 and a lip surface 218 of the secondary flange 200 (and around the plurality of secondary flange fasteners 219). The seal 300 can be any suitable material that forms an air-tight seal between the inner surface 118 of the flange 110 and a lip surface 218 of the secondary flange 200 while being resistant to the harsh conditions and chemistries present in the vacuum chamber 50. In an embodiment, the seal 300 is comprised of a metal, and more particularly copper.

The secondary flange 200 enables the supported component 130 to be removed from the vacuum chamber 50 so that it can be fixed or replaced without requiring removal of the flange 110 from the vacuum chamber 50. Once the supported component 130 is fixed or replaced, a new seal 300 is applied to the lip surface 218 (or the inner surface 118 of the flange 110) and the secondary flange 200 is reinstalled into the cut-out portion 117 and secured to the flange 110 by the plurality of secondary flange fasteners 219. In this manner, only the supported component 130 is removed from the vacuum chamber 50 without the need to uncouple the flange 110 from the vacuum chamber 50 and remove the entire TOF mass spectrometer assembly 100. This makes removal and replacement of the supported component 130 easier and faster, which results in less down time for the TOF mass spectrometer assembly 100. It also allows the rest of the TOF mass spectrometer assembly 100 to remain protected in the chamber from contamination (e.g., dust) and incidental damage.

As shown in FIG. 3, the vacuum chamber facing surface 212 of the secondary flange 200 extends along a plane P and the vacuum chamber facing surface 112 of the flange 110 extends along a plane Q. As shown, plane P does not extend along plane Q, however in other embodiments, the vacuum chamber facing surface 212 of the secondary flange 200 and the vacuum chamber facing surface 112 of the flange 110 extend along the same plane. In this manner, various sizes of the supported component 130 can be accommodated. In an embodiment, the secondary flange 200 may be manufactured to include the supported component 130 its connections 222 (if required) and corresponding feed-through 221. In said embodiment, exchanging the supported component 130 simply requires removal of the secondary flange 200 with the supported component 130 attached and then replacement with a different secondary flange 200 coupled to a different supported component. In each embodiment, a new seal 300 is installed prior to installation of the secondary flange 200 onto the flange 110. It is possible that, in some embodiments, the seal 300 is pre-installed onto the lip surface 218 of the secondary flange 200 to further increase the ease and speed in which the supported component 130 can be removed from and replaced back into the TOF mass spectrometer 100 assembly.

In other embodiments, it is possible to include additional flanges to enable removal of other specific components of the TOF mass spectrometer assembly 100 and/or access to specific areas of the TOF mass spectrometer assembly 100.

The invention is inclusive of combinations of the aspects described herein. References to an "embodiment" and the like refer to features that are present in at least one aspect of the invention. Separate references to "an embodiment" or "particular aspects" or the like do not necessarily refer to the same aspect or aspects; however, such aspects are not mutually exclusive, unless so indicated or as are readily apparent to one of skill in the art. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A time-of-flight mass spectrometer assembly for installation into a vacuum chamber, the time-of-flight mass spectrometer assembly comprising:

a flange configured to be secured to an opening of the vacuum chamber, the flange comprising a body including a vacuum chamber facing surface and an environment facing surface, wherein the body further defines a cut-out portion that extends between the vacuum chamber facing surface and the environment facing surface;

a plurality of stacked spectrometer components supported by the vacuum chamber facing surface of the flange and configured to be positioned inside the vacuum chamber;

a secondary flange configured to be removably secured within the cut-out portion to close-off the cut-out portion, wherein the secondary flange comprises a vacuum chamber facing surface and an environment facing surface; and a supported component configured to be coupled to the vacuum chamber facing surface of the secondary flange, wherein removal of the secondary flange from the flange acts to remove the supported component from the vacuum chamber while keeping the flange secured to the opening of the vacuum chamber.

2. The time-of-flight mass spectrometer assembly of claim 1, wherein the supported component is a detector.

3. The time-of-flight mass spectrometer assembly of claim 1, wherein the supported component is an ion source.

4. The time-of-flight mass spectrometer assembly of claim 1, wherein the vacuum chamber facing surface of the flange extends along a first plane and the vacuum chamber facing surface of the secondary flange extends along a second plane, where the first plane is different than the second plane when the secondary flange is coupled to the body of the flange.

5. The time-of-flight mass spectrometer assembly of claim 1, wherein the secondary flange is secured to the flange using a plurality of fasteners positioned around a perimeter of the secondary flange.

6. The time-of-flight mass spectrometer assembly of claim 1, wherein at least one of the plurality of stacked spectrometer components comprises an ion source.

7. The time-of-flight mass spectrometer assembly of claim 1, further comprising an air-tight seal positioned between the flange and the secondary flange.

8. The time-of-flight mass spectrometer assembly of claim 7, wherein the seal is comprised of a metal.

9. The time-of-flight mass spectrometer assembly of claim 1, wherein the secondary flange defines one or more pass-through connections to connect the supported component to a controller.

10. A time-of-flight mass spectrometer assembly comprising:

a flange comprising a vacuum chamber facing surface and an environment facing surface, wherein the flange defines an opening that extends between the vacuum chamber facing surface and the environment facing surface;

a plurality of stacked components supported by the vacuum chamber facing surface of the flange;

a secondary flange removably secured the flange and configured to block the opening, wherein the secondary flange comprises a vacuum chamber facing surface and an environment facing surface; and a supported component configured to be supported by the vacuum chamber facing surface of the secondary flange, wherein removal of the secondary flange from the flange acts to remove the supported component from the plurality of stacked components supported by the vacuum chamber facing surface of the flange.

11. The time-of-flight mass spectrometer assembly of claim 10, wherein the supported component is a detector.

12. The time-of-flight mass spectrometer assembly of claim 10, wherein the supported component is an ion source.

13. The time-of-flight mass spectrometer assembly of claim 10, wherein the vacuum chamber facing surface of the flange extends along a first plane and the vacuum chamber facing surface of the secondary flange extends along a second plane, wherein the first plane is different from the second plane when the secondary flange is removably secured within the opening of the flange.

14. The time-of-flight mass spectrometer assembly of claim 10, wherein the secondary flange is secured to the flange using a plurality of fasteners positioned around a perimeter of the secondary flange.

15. The time-of-flight mass spectrometer assembly of claim 10, wherein at least one of the plurality of stacked components comprises an ion source.

16. The time-of-flight mass spectrometer assembly of claim 10, further comprising a seal positioned between the flange and the secondary flange.

17. The time-of-flight mass spectrometer assembly of claim 16, wherein the seal is comprised of a metal.

18. The time-of-flight mass spectrometer assembly of claim 10, wherein the secondary flange defines one or more pass-through connections configured to connect the supported component to an external component.

19. A method of manufacturing a time-of-flight mass spectrometer assembly, the method comprising:

structuring a flange to:

comprise a vacuum chamber facing surface and an environment facing surface, and define an opening that extends between the vacuum chamber facing surface and the environment facing surface, and support a plurality of stacked components on the vacuum chamber facing surface of the flange;

structuring a secondary flange to:

comprise a vacuum chamber facing surface and an environment facing surface, and be removably secured to the flange to block the opening; and structuring a supported component to, be supported by the vacuum chamber facing surface of the secondary flange in correct proximity to the plurality of stacked components, and to be removed from the plurality of stacked components supported by the vacuum chamber facing surface of the flange by removal of the secondary flange from the flange.

* * * * *